United States Patent [19]

Levering

[11] 3,942,845

[45] Mar. 9, 1976

[54] TANDEM AXLE ANTI-SKID SYSTEM
[75] Inventor: Paul D. Levering, Berwick, Pa.
[73] Assignee: Dana Corporation, Toledo, Ohio
[22] Filed: Mar. 17, 1975
[21] Appl. No.: 558,898

[52] U.S. Cl. .................... 303/21 CH; 188/181 T
[51] Int. Cl.² .......................................... B60T 8/22
[58] Field of Search ......... 188/181 T, 181 A; 303/7,
303/21 F, 21 R, 21 CH, 21 B, 21 BB, 21 BE,
21 EB, 21 A, 22 R, 24 R, 24 B

[56] References Cited
UNITED STATES PATENTS

| | | | |
|---|---|---|---|
| 3,689,121 | 9/1972 | Kawabe et al. .................. | 303/21 CH |
| 3,711,162 | 1/1973 | Steinbrenner et al. .......... | 303/21 CH |
| 3,743,361 | 7/1973 | Vieth, Jr. ........................ | 303/21 CH |
| 3,847,446 | 11/1974 | Scharlack ....................... | 303/21 EB |

*Primary Examiner*—Duane A. Reger
*Attorney, Agent, or Firm*—David H. Wilson

[57] ABSTRACT

An anti-skid system for a tandem axle vehicle including an improved vehicle suspension for opposing a selected portion of the braking torque which tends to unload the front axle during breaking to eliminate brake hop. The suspension cooperates with an anti-skid circuit to increase braking efficiency. In one embodiment, the anti-skid circuit senses a skid condition at the rear wheels on a per side basis and controls the braking of the wheels on that side in response thereto. In an alternate embodiment, the anti-skid circuit senses a skid condition at either the front or rear wheels on a per side basis and controls the braking of the wheels on that side in response thereto.

14 Claims, 7 Drawing Figures

TANDEM AXLE ANTI-SKID SYSTEM

BACKGROUND OF THE INVENTION

1. FIELD OF THE INVENTION

This invention relates in general to anti-skid braking systems for tandem axle vehicles and in particular to an electronic anti-skid circuit which cooperates with an improved vehicle suspension to increase braking efficiency and eliminate brake hop.

2. DESCRIPTION OF THE PRIOR ART

During braking, a truck or other heavy duty vehicle is subject to severe static and dynamic forces which decrease braking efficiency and make it more difficult to maintain the vehicle under control. One example of this detrimental behavoir occurs when such a vehicle with a conventional suspension system, running unloaded or lightly loaded, is braked under sudden or emergency conditions. The forces generated subject the vehicle to severe vibrations known as "brake hop" or "wheel hop". These vibrations are characterized by vertical oscillations of the rear axle or rear set of axles and their associated wheels towards and away from the road. The resultant impacts of the wheels on the road produce forces which impair the safety of the operator and the equipment by reducing the operating life of the vehicle, shifting the load thereby damaging the cargo and the equipment, and generally reducing the operator control of the vehicle.

Many trucks and heavy duty vehicles have tandem axles which employ two spaced independently sprung axles having equalizing connections to equalize the loads on the axles. Common tandem axle construction utilizes springs which are rigidly secured to the axle seats by a suitable clamp or fastener device. Although braking forces generate brake hop to some degree in both axles, the brake hop is experienced primarily in the front axle of the pair which renders the equalizer connections ineffective during braking so that the vehicle weight is supported chiefly by the rear axle.

For example, when the brakes are applied, forces are introduced into the suspension which tend to rotate the axles about respective control points. These forces are transferred through the springs which are fixedly attached to the axles as a force couple or moments creating a downward force at the forward ends of the springs and an upward force at the rear ends of the springs. Reacting forces on the springs come into play and the result is that the wheels on the axles, and especially those on the front axle, rise from the road and subsequently return thereto. The cycle of axle and wheel rise and fall repeats during brake application with increasing frequency, shaking the vehicle, leading to early breakdown of the same and even endangering the vehicle driver who is subjected to great strain by the impacts as well as the stress of maintaining the vehicle under control.

U.S. Pat. No. 3,074,738, issued on Jan. 22, 1963 to James C. Ward and assigned to the assignee of the present application, discloses an improved suspension unit which includes an equalizing linkage interposed between the axle and spring and the vehicle chassis. This linkage includes an equalizer beam, rockably connected with the chassis and employed against a spring end, and a torque arm, pivotally connected at one end with the axle seat and at its other end with the equalizer beam in such a manner as to cancel the torsional forces created during a brake application. With vehicles having tandem running gear, the rockable equalizer beam is positioned between the axles and the respective axle torque arms are engageable therewith so as to overcome the torsionable forces. Therefore, the rigidly mounted springs are relieved of the braking torque so that they may perform their intended function of supporting vehicle load properly. Furthermore, the torque arms extending from the axle seats are connected to a common reference, namely the equalizer beam, to maintain thereby a common relation between the axles which thus may be maintained substantially parallel at all times.

Another example of detrimental behavior during braking is skidding due to wheel lock-up under severe or emergency conditions. Anti-skid control systems have been developed which modulate the brakes at one or more wheels, alternately applying the brakes to slow the vehicle and releasing the brakes to prevent lock-up of the wheels.

Typical anti-skid systems include three basic components, which are a wheel mounted tone wheel (also known as a rotor or an excitor), a sensor which picks up a signal from the tone wheel rotating with the vehicle wheel, and a control circuit or skid computer which utilizes the information from one or more sensors to direct the application or release of the brakes. In lighter vehicles, such as automobiles and light trucks, a single skid computer connected to separate sensors and tone wheels for each of the wheels may be utilized with satisfactory results. Generally, the front wheels of an automobile are more heavily loaded than the rear wheels thereof and this difference in loading is accenuated during braking conditions. Since the less heavily loaded rear wheels have a greater tendency to lock-up, some anti-skid systems compare the speed of rotation of the rear wheels with the speed of rotation of the front wheels and release the rear brakes when the difference is greater than a predetermined amount. Other systems utilize a standard reference signal to compare with the speed of rotation of each wheel where all the wheels are controlled separately or to compare with the lower speed of rotation of the two wheels at either end of the vehicle.

One form of anti-skid system for larger trucks and heavy duty vehicles has utilized the standard reference signal with braking control on a per axle basis, the comparison being with the lower of the speeds of rotation of the wheels attached to the axle. A select low circuit selects the wheel having the lower rotational velocity and compares the rate of change of that velocity, which is proportional to deceleration, to a standard reference signal representative of a skid condition. When the value of the rate of change equals or exceeds the reference signal the brakes associated with the wheels on the axle are modulated to eliminate the skid condition. If the vehicle is equipped with one or more tandem axles, where two axles are subjected to similar loading, the anti-skid system may sense a skid condition and control the brakes on a per side basis as disclosed in U.S. Pat. No. 3,847,446 issued on Nov. 12, 1974 to Ronald S. Scharlack.

SUMMARY OF THE INVENTION

The present invention involves an anti-skid braking system for tendem axle vehicles wherein the axles of the tandem axle unit are subjected to similar loads. The present invention includes an improved vehicle suspension having an equalizer linkage interposed between axle and spring assembly and the vehicle chassis. The linkage includes an equalizer beam, rockably connected with the chassis and employed against a spring end, and a torque arm, pivotally connected at one end with an axle seat and at its other end with the equalizer beam in such a manner as to oppose the torsional forces generated during a brake application. In a tandem axle unit, the rockable equalizer beam is positioned between the axles and the respective axle torque arms are engageable therewith.

The present invention also includes an anti-skid circuit which cooperates with the improved vehicle suspension to increase braking efficiency. In one embodiment, the improved vehicle suspension is set to oppose the torsional forces so that the front axle carries 5 – 10% more load than the rear axle of the tandem axle unit to make the wheels attached to the rear axle more skid prone. Therefore, only the rotationable velocity of each of the rear wheels is sensed on a per side basis and the braking of the wheels on that side is modulated in response to a sensed skid condition. In an alternate embodiment, the anti-skid circuit senses a skid condition at either the front or the rear wheels on a per side basis and modulates the braking of the wheels on that side in response thereto.

It is an object of the present invention to provide an antiskid system for a tandem axle vehicle which eliminates brake hop.

It is a further object of the present invention to provide an anti-skid system for a tandem axle vehicle which senses a skid condition only at the rear wheels of the tandem axle unit.

It is another object of the present invention to provide an anti-skid system which utilizes equalizing linkage to oppose a selected portion of the vehicle braking torque so as to load the front axle of a tandem axle unit during braking.

It is a further object of the present invention to decrease the complexity and cost of anti-skid systems by providing a vehicle suspension which mades the wheels attached to one axle more skid prone than the wheels attached to the other axle in a tandem axle unit and by modulating the brakes on per side basis in response to the sensing of a skid condition at the more skid prone wheel on that side.

DESCRIPTION OF THE PREFERRED EMBODIMENT

Figure 1:
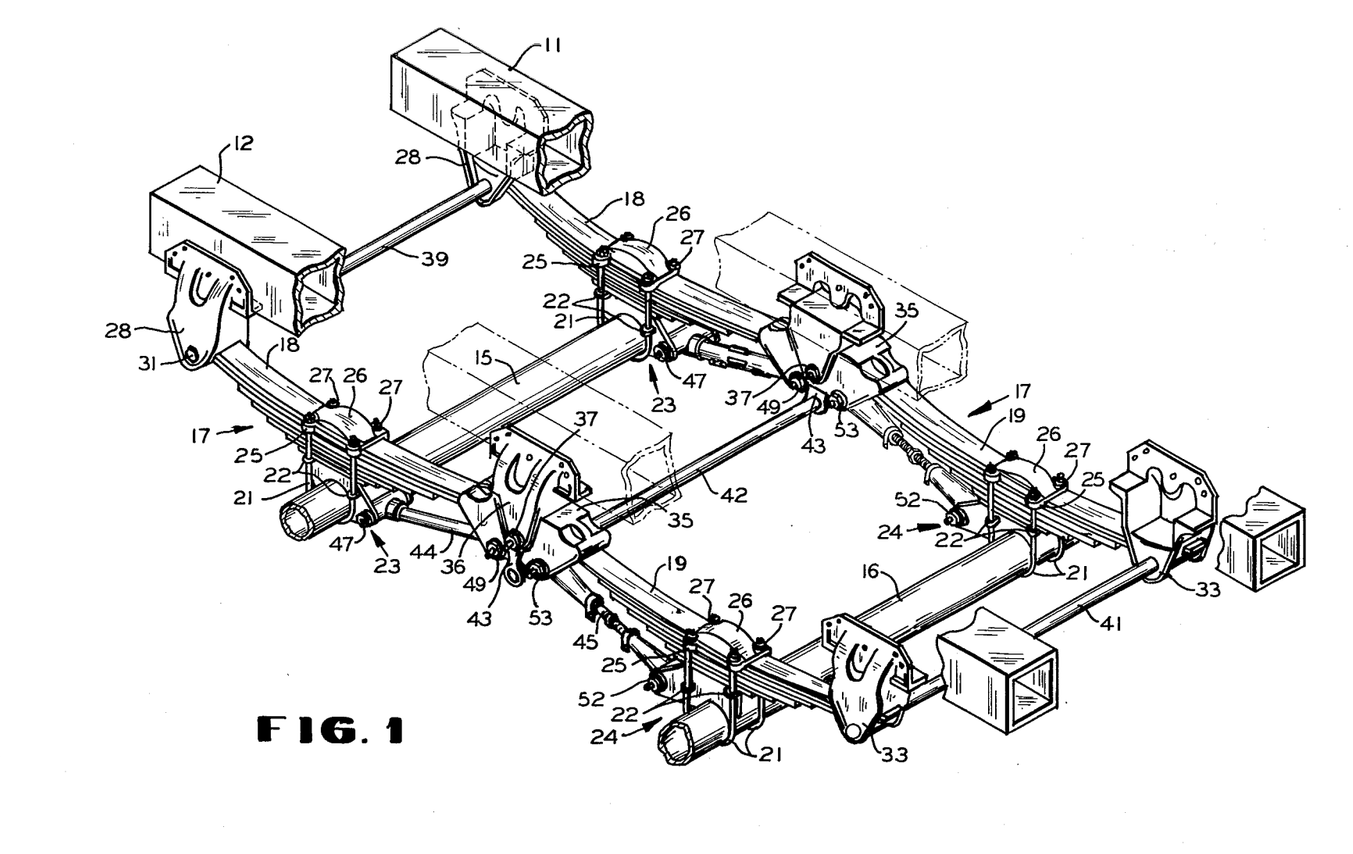
FIG. 1 is a perspective view of a tandem axle unit embodying at improved vehicle suspension according to the present invention.
Figures 2, 3, 4, 5:
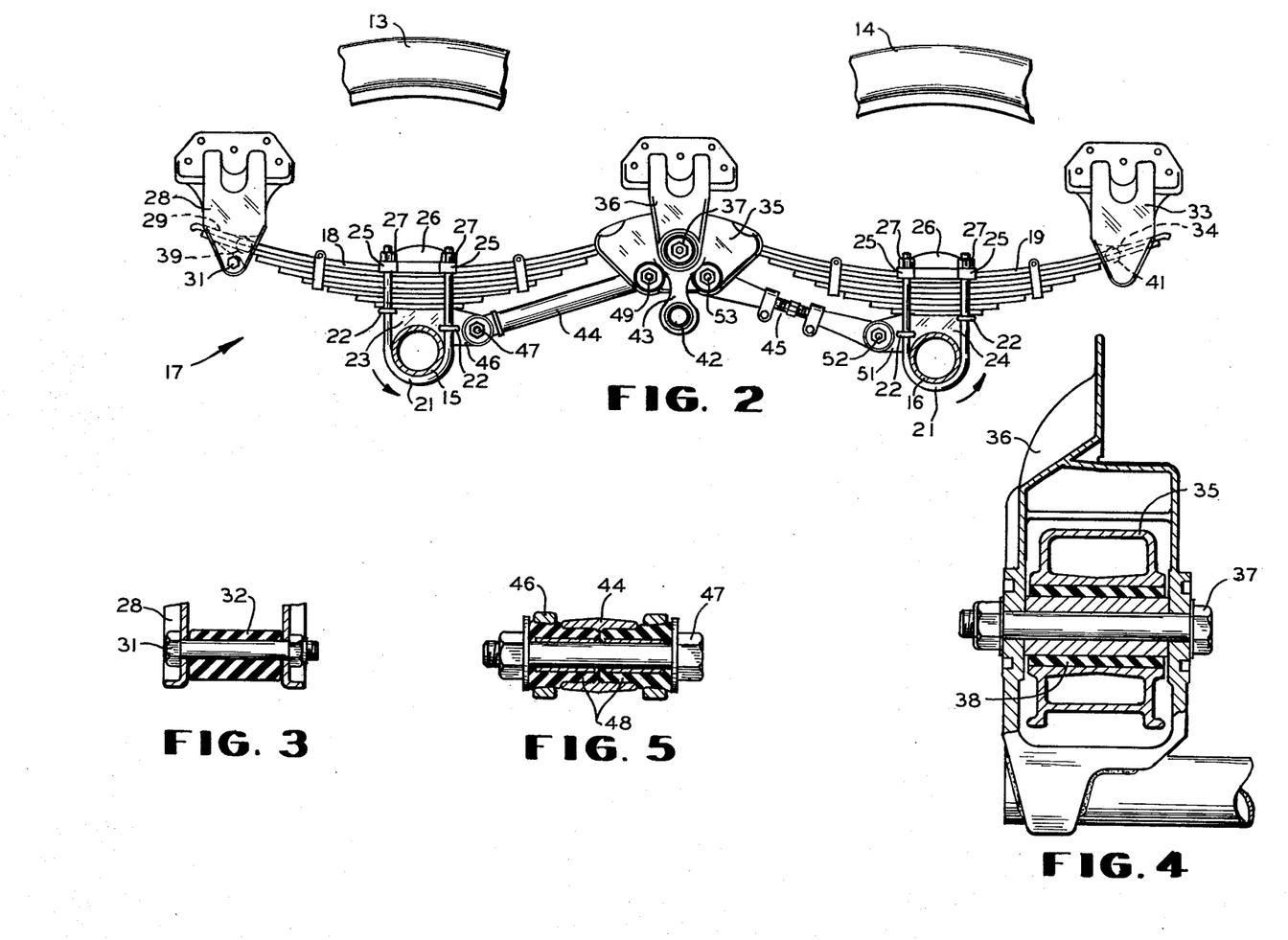
FIG. 2 is a side elevation of the tandem axle unit of FIG. 1.
FIG. 3 is a partial cross-sectional view taken through a front hanger bracket of the axle unit of FIG. 2.
FIG. 4 is a partial cross-sectional view taken through an equalizer beam and an equalizer bracket of the axle unit of FIG. 2.
FIG. 5 is a partial cross-sectional view of the connection between a torque arm and a yoke arm of the axle unit of FIG. 2.

Referring to FIGS. 1 and 2, there is shown a tandem axle unit embodying an improved vehicle suspension according to the present invention. The improved vehicle suspension cooperates with an electronic anti-skid circuit to increase braking efficiency and eliminate brake hop. FIG. 1 is a perspective view of the tandem axle unit wherein the chassis of a truck or heavy duty vehicle may have a pair of longitudinally extending side frame members or sills 11 and 12 to which the vehicle suspension is attached. FIG. 2 is a side elevation of the tandem axle unit of FIG. 1 showing the left side of the vehicle suspension and a portion of a left front tire 13 and a left rear tire 14. The left front tire 13 and left rear tire 14 are attached to the ends of a front axle 15 and a rear axle 16 respectively. A tandem spring assembly 17 is mounted at each end of the axles 15 and 16. Each tandem spring assembly 17 includes a front spring 18 which is attached to the front axle 15 and a rear spring 19 which is attached to the rear axle 16 by pairs of U-bolts 21. The ends of each of the U-bolts 21 pass through a pair of lugs 22 integral with either a front axle seat 23 or a rear axle seat 24 and a pair of lugs 25 integral with an upper U-bolt plate 26. A pair of nuts 27 are threaded onto the ends of the U-bolts 21 to secure the axles 15 and 16, the axle seats 23 and 24, and the upper U-bolt plates 26 to the springs 18 and 19.

On either side of the vehicle, each front spring 18 has its forward end supported in a front hangar bracket 28. The front hanger brackets 28 are attached to the forward ends of the side frame members 11 and 12. The end of each of the front springs 18 is received between a bracket shoulder 29 and a stop in the form of a cap screw 31 extending through the lower end of the hanger bracket 28. A resilient rubber spring retainer 32 surrounds the caps screw 31 as shown in FIG. 3. Furthermore, on either side of the vehicle chassis, each rear spring 19 has its rearward end engaged in a rear hanger bracket 33 attached to the rearward ends of the side frame members 11 and 12. The rearward ends of the springs 19 engage a bracket shoulder 34 for supporting the vehicle load.

the rearward end of each of the front springs 18 and the forward end of each of the rear springs 19 are connected to the vehicle chassis by a pair of equalizer beams 35 interposed between the adjacent ends of the springs 18 and 19 and rockably mounted on an equalizer bracket 36 attached to each of the side frame members 11 and 12. A cap screw 37 extends through the bracket 36 to provide a center of rotation for the beam 35. The cap screw 37 is surrounded by a rubber bushing 38 as shown in FIG. 4 to thereby provide a resilient bearing for the beam 35.

The two front hanger brackets 28 may be connected by a front brace rod 39; the two rear hanger brackets 33 may be connected by a rear brace rod 41, and the two equalizer brackets 36 may be connected by a center brace rod 42 which extends between the lower ends of a pair of cross braces 43. The brace rods 39, 41 and 42 tend to balance the forces generated by turning between the two sides of the suspension.

In summary, each tandem spring assembly 17 is connected to the respective ends of the axles 15 and 16 by the U-bolts 21, the axle seats 23 and 24, and the upper U-bolt plates 26. The forward end of each of the front springs 18 is received in the front hanger bracket 28 and the rearward end of each of the rear springs 19 is received in the rear hanger bracket 33. The rearward end of each of the front springs 18 and the forward end of each of the rear springs 19 are connected to the equalizer beam 35 which is rockably mounted on the equalizer bracket 36 to form a three point suspension for the vehicle chassis which uniformly distributes the load on the axles 15 and 16.

Upon application of the vehicle brakes, the substantially equal distribution of the load on the axles 15 and 16 is disturbed. Typically, there is a tendency of the rear axle 16 to rotate under the influence of braking torque in the direction of the arrow shown in FIG. 2, forcing the forward end of each of the rear springs 19 downwardly in the direction of such rotation, thereby lowering the rearward end of each of the equalizer beams 35, and correspondingly raising the forward end of each of the beams 35. This movement of the equalizer beams frees the rearward end of each of the front springs 18, thereby releasing the front axle 15 from the load of the vehicle.

The rotation of the rear axle 16, coupled with the fact that the application of the brakes also tends to cause the front axle 15 to rotate in the same direction as the rear axle 16 thereby raising the rearward end of each of the front springs 18, lifts the left front wheel 13 and the right front wheel (not shown) from the road to reduce the traction thereof thereby generating the previously described brake hop. In order to eliminate the undesirable brake hop, the present invention includes torque arms connected between the axles 15 and 16 and the equalizer beams 35.

Referring to FIGS. 1 and 2, there is shown a pair of front torque arms 44 connected between the equalizer beams 35 and the front axle seats 23 and a pair of rear torque arms connected between the equalizer beams 35 and the rear axle seats 24. Each front axle seat 23 is provided with a rearwardly extending yoke arm 46 to which the forward end of the front torque arm 44 is pivotally connected by a cap screw 47. As shown in FIG. 5, a pair of resilient rubber bushings 48 are interposed between the front torque arm 44 and the pivotal connection formed by the yoke arm 46 and the cap screw 47. The other end of the front torque arm 44 is pivotally connected to the equalizer beam 35 with a cap screw 49 in a similar manner.

Each rear axle seat 24 is provided with a forwardly extending yoke arm 51 to which the rearward end of the rear torque arm 45 is pivotally connected. The other end of each rear torque arm 45 is pivotally connected to the equalizer beam 35. Cap screws 52 and 53 and rubber bushings (not shown) similar to the cap screw 47 and the rubber bushing 48 are utilized at the pivotal connections for the rear torque arms 45.

The rear torque arms 45 may be of the adjustable type as shown in FIGS. 1 and 2 or may be of the one-piece type similar to the front torque arms 44. The adjustable type of torque arm acts as a turnbuckle to move the opposite ends together or apart as desired to facilitate alignment of the axles 15 and 16. The connections of the torque arms 44 and 45 to their respective axle seats 23 and 24 provide convenient control points about which the axles 15 and 16 tend to rotate during application of the brakes. Furthermore, although the torque arms 44 and 45 are pivoted at their ends, they also provide connections capable of transmitting torque. Therefore, since the engagements of the springs 18 and 19 with the equalizer beams 35 occur at points above the center of rotation of the equalizer beam 35 and the connections of the torque arms 44 and 45 occur at points below the center of rotation of the equalizer beam 35, there is provision for applying equalizing forces to cancel the rotational forces transmitted to the beams 35 by the springs 18 and 19 during braking of the vehicle.

When the vehicle brakes are applied, the braking torque tends to rotate the rear axle 16 about the pivotal connection between the rear torque arm 45 and the yoke arm 51 as defined by the cap screw 52. This rotation causes an upward force to be transmitted by the axle 16 to the rearward end of the rear spring 19. This upward force is cancelled by the downward force proportionate to the weight of the supported vehicle since the rearward end of the rear spring 19 engages a nondepressable portion of the rear hanger bracket 33.

As the braking torque tends to rotate the rear axle, the forward end of the rear spring 19 tends to move downwardly applying a force to rotate the equalizer beam 35. This downwardly directed force, acting through a moment arm perpendicular to the direction of the force and passing through the center of rotation of the equalizer beam as defined by the cap screw 37, generates a moment which tends to rotate the equalizer beam 35 in a clockwise direction about the cap screw 37 as viewed in FIG. 2. The moment generated by the forward end of the rear spring 19 is opposed by a moment generated by the force applied by the torque arm 45.

The clockwise movement of the equalizer beam 35 tends to rotate the connection with the torque rod 45 at the cap screw 53 away from the rear axle 16. This rotation is resisted by the torque arm 45 which is connected to the rear axle 16 at the yoke arm 51. This resisting force acting along the longitudinal axis of the torque arm 45, through a moment arm perpendicular to the direction of the force and passing through the center of rotation of the equalizer beam 35 as defined by the cap screw 37, will generate a moment to oppose the moment generated by the downwardly directed force at the forward end of the rear spring 19 if an extension of the longitudinal axis of the torque arm 45 passes below the center of rotation defined by the cap screw 37.

The braking torque tends to rotate the front axle 15 in the same direction as the rear axle 16 about the pivotal connection between the front torque arm 44 and the yoke arm 46 as defined by the cap screw 47. This rotation causes a downward force to be transmitted by the axle 15 to the forward end of the front spring 18. This downward force at the forward end of the front spring 18 is resisted and absorbed by the resilient rubber spring retainer 32 on the cap screw 31. The braking torque also causes an upward movement of the rearward end of the front spring 18 to apply force to the equalizer beam 35. This upwardly directed force, acting through a moment arm perpendicular to the direction of the force and passing through the center of rotation of the equalizer beam as defined by the cap screw 37, generates a moment which tends to rotate the equalizer beam in a clockwise direction as viewed in FIG. 2. The moment generated by the rearward end of the front spring 19 is opposed by a moment generated by the force applied by the torque arm 44.

The clockwise movement of the equalizer beam 35 tends to rotate the connection with the torque rod 44 at the capscrew 49 toward the front axle 15. This rotation is resisted by the torque rod 44 which is connected to the front axle 15 at the yoke arm 46. This resisting force acting along the longitudinal axis of the torque arm 44, through a moment arm perpendicular to the direction of the force and passing through the center of rotation of the equalizer beam 35 as defined by the cap screw 37, will generate a moment to oppose the moment generated by the upwardly directed force at the rearward end of the front spring 18 if an extension of the longitudinal axis of the torque arm 44 passes below the center of rotation defined by the cap screw 37.

In summary, the improved suspension according to the present invention eliminates brake hop during braking by equalizing the load on each axle of a pair of axles connected in tandem. As shown in FIG. 2, the rearward end of the front spring 18 and the forward end of the rear spring 19 tend to move upwardly and downwardly respectively as the axles 15 and 16 rotate under the influence of the braking torque. This movement of the spring ends applies forces to rotate the equalizer beam 35 in a clockwise direction about a pivot point defined by the cap screw 37. The rotation of the equalizer beam 35 is resisted by the torque rods 44 and 45 which apply opposing forces. Since the moments generated by the spring ends are opposed by the moments generated by the torque rods 44 and 45, the load on the forward axle will be determined by the sum of the moments about the pivot point defined by the cap screw 37.

If the sum of the moments is zero, then the load will be equally distributed between the two axles. In actual practice, when the improved suspension has been utilized without an anti-skid circuit, it has been found desirable to increase the load on the front axle beyond equality to a value 12 – 18% greater than the load on the rear axle during braking to more effectively reduce brake hop. This is accomplished by adjusting the length of the moment arm for the torque arms 44 and 45 through the positioning of the connections defined by the cap screws 49 and 53. For the geometry shown in FIG. 2, the connections would be lowered with respect to the capscrew 37 to increase the load on the front axle 15 and would be raised with respect to the cap screw 37 to decrease the load on the front axle 15.

The present invention also includes an anti-skid circuit which cooperates with the above disclosed improved vehicle suspension to increase braking efficiency. A first embodiment is shown in a partial schematic and block diagram, FIG. 6, of a tandem axle unit. A front axle 61 has attached thereto a pair of left front wheels 62 and a pair of right front wheels 65. A rear axle 64 has attached thereto a pair of left rear wheels 65 and a pair of right rear wheels 66. Trucks and heavy duty vehicles conventionally utilize a compressed air braking system. Such a system is shown schematically in FIG. 6. A compressor 67 is driven from the vehicle engine (not shown) to supply air to a reservoir 68. The air is stored in the reservoir for use in the braking system so as to permit several successive brake applications without exhausting the air supply. Each pair of wheels is equipped with brakes (not shown) which are actuated by an associated brake actuating mechanism 69. In a conventional compressed air braking system, the compressed air from the reservoir 68 is applied to the actuating mechanisms 69 to actuate the brakes when a brake pedal (not shown) is depressed to open a brake valve 71 connected between the reservoir 68 and the actuating mechanisms 69. When the brake pedal is released, the value 71 closes its inlet from the reservoir 68 and vents the actuating mechanisms 69 to the atmosphere to relieve the brakes.

Figure 6:
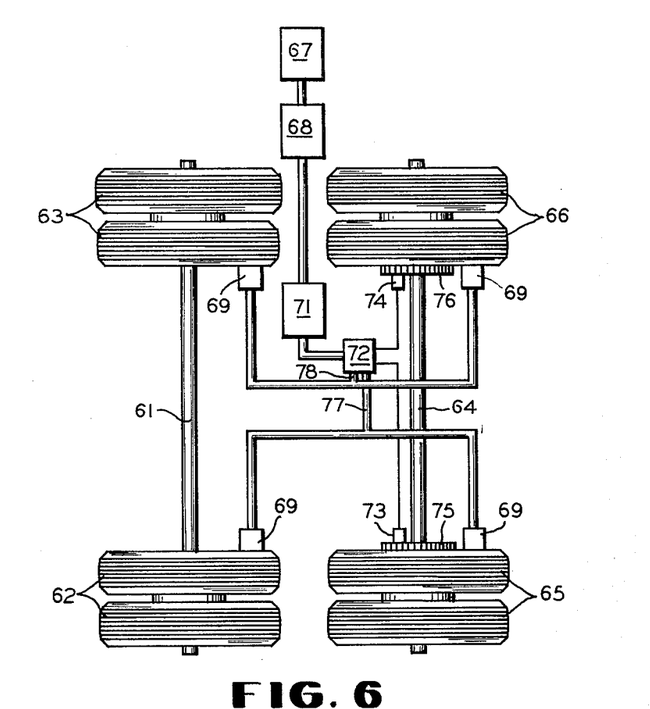
FIG. 6 is a partial schematic and block diagram of the axle unit of FIG. 2 including an anti-skid circuit according to the present invention.

In the present invention, an anti-skid circuit is connected to the compressed air braking system to improve the braking performance. A modulating valve and skid computer 72 is connected between the air reservoir 71 and the actuating mechanisms 69. The valve and computer 72 includes a pair of normally open modulating valves (not shown) which allow compressed air to flow in an unrestricted manner from the reservoir 71 to the actuating mechanisms 69 when the brake valve 71 is open and from the actuating mechanisms to the brake valve when the brake valve vents to the atmosphere.

If the improved vehicle suspension according to the present invention were set to equalize the load between the front and rear axles, then each pair of wheels would have to be monitored in order to detect a skid condition since no one pair of wheels would be more skid prone than any other pair of wheels. Accordingly, the improved vehicle suspension associated with the skid control circuit of FIG. 6 is set to transfer 5 – 10% more load to the front axle during braking so that the rear axle is always more lightly loaded and therefore more skid prone. Since the rear wheels are more skid prone, only the rate of change of velocity of the rear wheels need be monitored in order to detect a skid condition thereby reducing the complexity and cost of the anti-skid circuit. Furthermore, the tandem axle anti-skid system with a 5–10% load transfer and rear wheel skid monitoring produces the unobvious result of braking performance comparable to a system having skid sensing at both front and rear wheels and no load transfer and the unobvious result of only 10% less braking performance than a system having skid sensing at both front and rear wheels and a load transfer to equalize the loads on both axles.

The valve and computer 72 of FIG. 6 is electrically connected to a pair of sensors 73 and 74. The skid computer receives wheel rotational velocity information from the sensor 73 associated with the left rear wheels 65 and a tone wheel 75. The skid computer also receives wheel rotational velocity information from the sensor 74 associated with the right rear wheels 66 and a tone wheel 76. The tone wheels, sensors and skid computer may be of a known construction wherein each sensor will provide a pulsating or alternating electrical signal representative of the rotational velocity of the associated wheels as the tone wheel rotates with them. Since the rate of change of rotational velocity is proportional to the deceleration of the vehicle wheels, the skid computer compares the rate of change of the sensor output signal with a predetermined reference signal representative of a skid condition. When the rate of change of the sensor output signal is equal to or greater than the reference signal, the skid computer sends a control signal to the modulating valve. The brakes may be modulated on a per side basis as described below or all the brakes may be modulated together in response to a skid condition at either or both sides of the vehicle.

When a skid condition is sensed at the left rear wheels 65, the skid sensor sends a control signal to the modulating valve connected to the left side actuating mechanisms. The modulating valve then closes its input from the brake valve 71 and vents the actuating mechanisms 69 to the atmosphere through the left brake line 77 to relieve the brakes at the left front wheels 62 and the left rear wheels 65. The vehicle wheels will then decelerate at a lesser rate until the rate of change of the sensor output signal is reduced to a value that is less than the value of the reference signal. Then the skid computer removes the control signal which causes the modulating valve to open to reapply the brakes. In a similar manner a skid condition sensed at the right rear wheels will generate a control signal to the modulating valve connected to the right side actuating mechanisms. The modulating valve then closes its input from the brake valve 71 and vents the actuating mechanisms 69 to the atmosphere through the right brake line 78 to relieve the brakes at the right front wheels 63 and the right rear wheels 66. The cyclic action of either or both modulating valves will continue until the associated wheels are no longer in a skid condition or the brake pedal is released.

Figure 7:
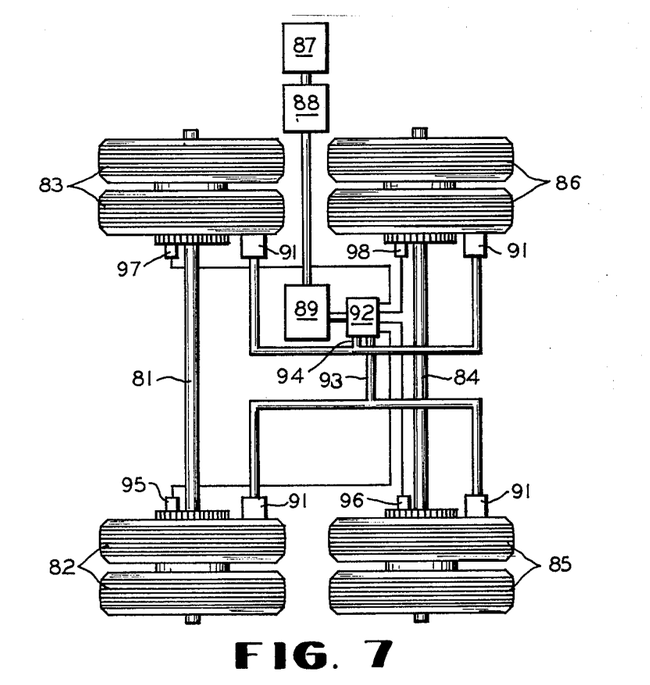
FIG. 7 is a partial schematic and block diagram of the axle unit of FIG. 2 including an alternate embodiment of an anti-skid circuit according to the present invention.

FIG. 7 is a partial schematic and block diagram of an alternate embodiment of the anti-skid circuit according to the present invention wherein the pair of wheels having the lower rotational velocity actuate the brake modulating controls for the wheels on that side. A front axle 81 has attached thereto a pair of left front wheels 82 and a pair of right front wheels 83. A rear axle 84 has attached thereto a pair of left rear wheels 85 and a pair of right rear wheels 86. A compressor 87 is driven from the vehicle engine (not shown) to supply compressed air to a reservoir 88. The reservoir 88 is connected through a brake valve 89 to a brake actuating mechanism 91 at each pair of wheels. A modulating valve and skid computer 92 is connected between the brake valve 89 and the actuating mechanisms 91. When a brake pedal (not shown) is depressed, compressed air flows from the reservoir through a pair of normally open modulating valves in the valve and computer 92 to the actuating mechanisms 91 for the left side wheels 82 and 85 via brake line 93 and to the actuating mechanisms 91 for the right side wheels 83 and 86 via a brake line 94.

The valve and computer 92 is electrically connected to a pair of left side sensors 95 and 96 and to a pair of right side sensors 97 and 98. The skid computer includes a left side select low logic circuit for selecting the lower rotational velocity of the left side wheel pairs 82 and 85 and a right side select low logic circuit for selecting the lower rotational velocity of the right side wheel pairs 83 and 86. Since the logic circuits are similar, only the operation of the left side circuit will be explained. The left side select low logic selects the lower rotational velocity output signal from the left side sensors 95 and 96 since that pair of wheels which is first in a skid condition will have the lower rotational velocity. The rate of change of the selected sensor output signal is compared with a reference signal representative of a skid condition. When the value of the rate of change exceeds the reference signal, the skid computer will generate a control signal to the modulating valve connected to the left side actuating mechanisms. The modulating valve then closes its input from the brake valve 89 and vents the actuating mechanisms 91 to the atmosphere through the left brake line 93 to relieve the brakes at the left front wheels 82 and the left rear wheels 85. The left side wheels will then decelerate at a lesser rate until the rate of change of the selected sensor output signal is reduced to a value that is less than the value of the reference signal. Then the skid computer removes the control signal which causes the modulating valve to open to reapply the brakes. The cyclic action of the modulating valve will continue until the associated wheels are no longer in a skin condition or the brake pedal is released.

In summary, the present invention includes an improved vehicle suspension having an equalizing linkage which opposes the braking torque applied to the vehicle suspension to transfer a selected portion of the vehicle load to the front axle of a tandem axle unit during braking. In one embodiment, the equalizing linkage is set to transfer 5–10% more load to the front axle thereby making the wheels attached to the rear axle more skid prone. A skid-control circuit utilizing conventional components senses a skid condition at either of the rear wheels on a per side basis and modulates the brakes of the wheels on that side in response thereto. The brakes are modulated by alternate application and relief until the skid condition is eliminated or the brake pedal is released.

In an alternate embodiment, the anti-skid circuit includes select low logic which selects the sensor output signal of the wheel having the lower rotational velocity at either the front or rear wheels on a per side basis. When a skid condition is sensed, the circuit modulates the braking of the wheels on that side of the vehicle.

In accordance with the provisions of the patent status, I have explained the principle and mode of operation of my invention and have illustrated and described what I now consider to represent its best embodiment. However, I desire to have it understood that the invention may be practiced otherwise than as specifically illustrated and described without departing from its spirit or scope.

What I claim is:

1. An anti-skid system for a vehicle having a load supporting tandem axle unit, comprising:
   means for transferring a selected portion of the vehicle load to one of the axles of said tandem axle unit during braking whereby the load imposed on said one axle exceeds the load imposed on the other axle of said tandem axle unit;
   sensing means for sensing the rotational velocity of a wheel attached to said other axle and generating an output signal representative of the sensed velocity;
   control means responsive to said output signal for detecting a skid condition at said wheel attached to said other axle and generating a control signal in reponse thereto; and
   actuating means responsive to said control signal for modulating the brakes at said wheel attached to said other axle and a wheel attached to said one axle.

2. A system according to claim 1 wherein the geometric relationship between said load transferring means and said tandem axle unit is such that the load imposed on said one axle is in the range of 5 to 10% greater than the load imposed on said other axle during braking.

3. A system according to claim 1 wherein said one axle is the front axle and said other axle is the rear axle of said tandem axle unit.

4. A system according to claim 1 wherein said vehicle includes a chassis and wherein said load transferring means includes on either side of said chassis: an equalizing beam pivotally attached to said chassis intermediate said axles; paired springs, said interposed between said chassis and a respective one of said axles, adjacent ends being engagable with said equalizer beam in spaced relation to the pivot thereof; a pair of torque arms pivotally connected at one end to a respective one of said axles, pivotally connected at the other end to said equalizer beam in spaced relation to the pivot thereof, and arranged to sustain a force opposed to the brake forces applied to said equalizer beam through said axles and said springs during braking, whereby brake hop is substantially eliminated.

5. A system according to claim 1 wherein said sensing means includes a tone wheel attached for rotation with said wheel attached to said other axle and a sensor responsive to the rotation of said tone wheel for generating said output signal.

6. A system according to claim 1 wherein said control means is a skid computer which includes means for generating a reference signal representing a skid condition; means responsive to said output signal for generating a signal representative of the rate of change of said output signal; and means for comparing the magnitudes of said reference signal and said rate of change signal and for generating said control signal when the magnitude of said rate of change signal exceeds the magnitude of said reference signal.

7. A system according to claim 1 wherein said actuating means includes means responsive to said control signal for relieving the brakes at said wheels.

8. A system according to claim 7 wherein said vehicle includes a compressed air braking system having a source of compressed air connected through a brake valve to an actuating mechanism at each of said wheels and wherein said brake relief means is a normally open modulating valve connected between said brake valve and said actuating mechanisms which vents said actuating mechanisms to the atmosphere in response to said control signal.

9. A system according to claim 1 including a second sensing means for sensing the rotational velocity of said wheel attached to said one axle and generating a second output signal representative of the sensed velocity and wherein said control means includes means for selecting the one of said first and second output signals representing the slower rotational velocity and wherein said control means is responsive to said selected output signal for detecting a skid condition at the one of said wheels associated with said selected output signal for generating said control signal in response thereto.

10. A system according to claim 9 wherein said selecting means is a select low logic circuit.

11. An anti-skid system for a vehicle including a load supporting tandem axle unit having a front axle proximately spaced with respect to a rear axle, wherein each of the axles has a left side wheel and a right side wheel attached thereto, comprising:
means for transferring a selected portion of the vehicle load to said front axle during braking whereby the load imposed on said front axle exceeds the load imposed on said rear axle;
a first sensing means for sensing the rotational velocity of said left side rear wheel and generating a first output signal representative of the sensed velocity;
a second sensing means for sensing the rotational velocity of said right side rear wheel and generating a second output signal representative of the sensed velocity;
control means reponsive to said first output signal for detecting a skid condition at said left side rear wheel and for generating a first control signal in response thereto and responsive to said second output signal for detecting a skid condition at said right side rear wheel and for generating a second control signal in response thereto;
first actuating means responsive to said first control signal for modulating the brakes at said left side front wheel and said left side rear wheel; and
second actuating means responsive to said second control signal for modulating the brakes at said right side front wheel and said right side rear wheel.

12. A system according to claim 11 wherein the geometric relationship between said load transferring means and said tandem axle unit is such that the load imposed on said front axle is in the range of 5 to 10% greater than the load imposed on said rear axle during braking.

13. A system according to claim 11 including:
a third sensing means for sensing the rotational velocity of said left side front wheel and generating a third output signal representative of the sensed velocity;
a fourth sensing means for sensing the rotational velocity of said right side front wheel and generating a fourth output signal representative of the sensed velocity;
and wherein said control means includes a first means for selecting the one of said first and third output signals representing the slower rotational velocity, said control means being responsive to said selected output signal for detecting a skid condition at the one of said left side front wheel and said left side rear wheel associated with said selected output signal and for generating said first control signal in response thereto, and wherein said control means includes a second means for selecting the one of said second and fourth output signals representing the slower rotational velocity, said control means being responsive to said selected output signal for detecting a skid condition at the one of said right side front wheel and said right side rear wheel associated with said selected output signal and for generating said second control signal in response thereto.

14. An anti-skid system for a vehicle including a load supporting tandem axle unit having a front axle proximately spaced with respect to a rear axle, wherein each of the axles has a left side wheel and a right side wheel attached thereto, comprising:
means for equalizing the vehicle load between said front and rear axles during braking;
a sensing means associated with each of said wheels for sensing the rotational velocity of said associated wheel and generating an output signal representative of the sensed velocity;
first actuating means responsive to a first control signal for modulating the brakes at said left side wheels;
second actuating means responsive to a second control signal for modulating the brakes at said right side wheels;
control means reponsive to said output signals representative of the sensed velocities at said left side wheels for selecting the one of said output signals representing the slower rotational velocity, said control means being responsive to said selected output signal for detecting a skid condition at the one of said left side wheels associated with said selected output signal and for generating said first control signal in response thereto; and wherein said control means is responsive to the sensed velocities at said right side wheels for selecting the one of said output signals representing the slower rotational velocity, said control means being responsive to said selected output signal for detecting a skid condition at the one of said right side wheels associated with said selected output signal and for generating said second control signal in response thereto.

* * * * *

UNITED STATES PATENT OFFICE
CERTIFICATE OF CORRECTION

Patent No. 3,942,845    Dated March 9, 1976

Inventor(s) Paul D. Levering

It is certified that error appears in the above-identified patent and that said Letters Patent are hereby corrected as shown below:

Column 3, line 50,    "at" should be -- an --.

Column 4, line 37,    "caps" should be -- cap --.
Column 4, line 45,    "the" should be -- The --.
Column 10, line 67,   "said" should be -- each --.

Signed and Sealed this

Third Day of August 1976

[SEAL]

Attest:

RUTH C. MASON
Attesting Officer

C. MARSHALL DANN
Commissioner of Patents and Trademarks